US006476875B2

(12) United States Patent
Correa et al.

(10) Patent No.: US 6,476,875 B2

(45) Date of Patent: Nov. 5, 2002

(54) METHOD AND APPARATUS FOR PROCESSING VIDEO PICTURES, ESPECIALLY FOR FALSE CONTOUR EFFECT COMPENSATION

(75) Inventors: Carlos Correa, Villingen-Schwenningen (DE); Gangolf Hirtz, Kronach (DE); Sebastien Weitbruch, Mönchweiler (DE); Didier Doyen, La Bouexière (FR); Jean-Claude Chevet, Betton (FR)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/814,840

(22) Filed: Mar. 22, 2001

(65) Prior Publication Data

US 2001/0012075 A1 Aug. 9, 2001

Related U.S. Application Data

(63) Continuation of application No. 09/365,451, filed on Aug. 2, 1999.

(30) Foreign Application Priority Data

| | | |
|---|---|---|
| Aug. 7, 1998 | (EP) | 98114883 |
| Sep. 16, 1998 | (EP) | 98117523 |
| Nov. 10, 1998 | (EP) | 98121334 |

(51) Int. Cl.[7] .......... H04N 5/21; H04N 9/64; G09G 3/36

(52) U.S. Cl. .......... 348/607; 348/771; 345/691

(58) Field of Search .......... 348/771, 797, 348/800, 795, 614, 607, 615, 618; 345/611, 672, 690, 691

(56) References Cited

U.S. PATENT DOCUMENTS

| | | | | |
|---|---|---|---|---|
| 5,841,413 A | * 11/1998 | Zhu et al. | 345/63 |
| 6,025,818 A | * 2/2000 | Okano | 345/63 |
| 6,208,467 B1 | * 3/2001 | Naka et al. | 359/618 |
| 6,333,766 B1 | * 12/2001 | Kougami et al. | 348/687 |

FOREIGN PATENT DOCUMENTS

| | | |
|---|---|---|
| EP | 720139 A2 * | 3/1996 |
| EP | 0720139 | 7/1996 |
| EP | 0822536 | 2/1998 |
| EP | 0840274 | 5/1998 |
| EP | 0847037 | 6/1998 |

OTHER PUBLICATIONS

Yamaguchi et al., "Improvement in PDP Picture Quality by Three–Dimensional Scattering of Dynamic False Contours", SID International Symposium Digest of Technical Papers, San Diego, May 12–17, 1996, vol. 27, May 12, 1996, pp. 291–294.

Search Report for EPO Patent Appln. No. 98 12 1334.

* cited by examiner

*Primary Examiner*—John Miller
*Assistant Examiner*—Annan Q Shang
(74) *Attorney, Agent, or Firm*—Joseph S. Tripoli; Harvey D. Fried; Sammy S. Henig

(57) ABSTRACT

With the new plasma display panel technology new kinds of artefacts can occur in video pictures. These artefacts are commonly described as "dynamic false contour effect", since they correspond to disturbances of gray levels and colors in the form of an apparition of colored edges in the picture when the observation point on the PDP screen moves.

According to the invention, such an artefact is compensated by analyzing the pictures, and determining the pixels which need to be corrected. The digital sub-field code words of these pixels are replaced by corrected sub-field code words. Thereby, the correction sub-fields (C1, C2, C3) which are inserted in or omitted from the digital code word are selected under consideration of its position within the frame period for optimal results.

6 Claims, 8 Drawing Sheets

METHOD AND APPARATUS FOR PROCESSING VIDEO PICTURES, ESPECIALLY FOR FALSE CONTOUR EFFECT COMPENSATION

This application is a continuation of application Ser. No. 09/365,451, filed Aug. 2, 1999.

BACKGROUND OF THE INVENTION

The invention relates to a method and apparatus for processing video pictures, especially for false contour effect compensation.

More specifically the invention is closely related to a kind of video processing for improving the picture quality of pictures which are displayed on matrix displays like plasma display panels (PDP) or display devices with digital micro mirror arrays (DMD).

Although plasma display panels are known for many years, plasma displays are encountering a growing interest from TV manufacturers. Indeed, this technology now makes it possible to achieve flat color panels of large size and with limited depths without any viewing angle constraints. The size of the displays may be much larger than the classical CRT picture tubes would have ever been allowed.

Referring to the latest generation of European TV sets, a lot of work has been made to improve its picture quality. Consequently, there is a strong demand, that a TV set built in a new technology like the plasma display technology has to provide a picture so good or better than the old standard TV technology. On one hand, the plasma display technology gives the possibility of nearly unlimited screen size, also of attractive thickness, but on the other hand, it generates new kinds of artefacts which could damage the picture quality. Most of these artefacts are different from the known artefacts occurring on classical CRT color picture tubes. Already due to this different appearance of the artefacts makes them more visible to the viewer since the viewer is used to see the well-known old TV artefacts.

The invention deals with a specific new artefact, which is called "dynamic false contour effect" since it corresponds to disturbances of gray levels and colors in the form of an apparition of colored edges in the picture when an observation point on the matrix screen moves. This kind of artefact is enhanced when the image has a smooth gradation like when the skin of a person is being displayed (e.g. displaying of a face or an arm, etc.). In addition, the same problem occurs on static images when observers are shaking their heads and that leads to the conclusion that such a failure depends on the human visual perception and happens on the retina of the eye.

Two approaches have been discussed to compensate for the false contour effect. As the false contour effect is directly related to the sub-field organization of the used plasma technology one approach is to make an optimization of the sub-field organization of the plasma display panels. The sub-field organization will be explained in greater detail below but for the moment it should be noted that it is a kind of decomposition of the 8-bit gray level in 8 or more lighting sub-periods. An optimization of such a picture encoding will have, indeed, a positive effect on the false contour effect. Nevertheless, such a solution can only slightly reduce the false contour effect amplitude but in any cases the effect will still occur and will be perceivable. Furthermore, sub-field organization is not a simple matter of design choice. The more sub-fields are allowed the more complicated will the plasma display panel be. So, optimization of the sub-field organization is only possible in a narrow range and will not eliminate this effect alone.

The second approach for the solution of above-mentioned problem is known under the expression "pulse equalization technique". This technique is described e.g. in Euro Display 1996, "An Equalising Pulse Technique for Improving the Gray Scale Capability of Plasma Displays", K. Toda et al., pages 39 to 42. This technique is a more complex one. It utilizes equalizing pulses which are added or separated from the TV signal when disturbances of gray scales are foreseen. In addition for better compensation quality, since the fact that the false contour effect is motion relevant, different pulses for each possible speed are needed. That leads to the need of a big memory storing a number of big look-up tables (LUT) for each speed and there is a need of a motion estimator. A problem with these equalizing pulses is that they are used to increase or decrease the amplitude of the video signal in area where false contour effect is likely to occur. Thus the correction value is added to the pixel value (RGB data for Plasma Displays) before the corresponding sub-field code word is calculated. Therefore, its not taken into account at which position within the frame period a sub-field is inserted or omitted.

SUMMARY OF THE INVENTION

Therefore, it is an object of the present invention to disclose a method and an apparatus which is based on the known solutions using equalizing pulses but which allows for a more efficient false contour effect compensation. This object is achieved by the measures claimed in claims 1 and 4.

The general idea of the invention is that the correction of pixel values is made not on amplitude values only without consideration of the position of the sub-fields which are inserted or omitted but on sub-field level. When the motion in the picture is known for the pixels then the sub-fields for correction are positioned at the best possible location in the frame period for false contour effect compensation.

A correction performed on subfield level allows directly to insert or to remove subfields on the position (time position within the frame) where too much or not enough light impulses are available. This way it's possible to compensate directly the failures where they occur.

Advantageously, additional embodiments of the inventive method are disclosed in the respective dependent claims.

One example for an apparatus according to the invention is disclosed in claim 3. With a motion estimator the apparatus calculates motion vectors for blocks of pixels of the video frames. It also comprises means for determining critical pixel value transitions which are moving. For given motion vectors and critical pixel value transitions look-up tables are provided in which the corrected digital code words are stored which are to be used for a good false contour effect compensation.

BRIEF DESCRIPTION OF THE DRAWING

Exemplary embodiments of the invention are illustrated in the drawings and are explained in more detail in the following description.

In the figures.

DESCRIPTION OF THE PREFERRED EMBODIMENTS

Figure 1:
FIG. 1 shows a video picture in which the false contour effect is simulated.

The artefact due to the false contour effect is shown in FIG. 1. On the arm of the displayed woman are shown two dark lines, which e.g. are caused by this false contour effect. Also in the face of the woman such dark lines occur on the right side.

A plasma display panel utilizes a matrix array of discharge cells which could only be switched ON or OFF. Also unlike a CRT or LCD in which gray levels are expressed by analog control of the light emission, in a PDP the gray level is controlled by modulating the number of light pulses per frame. This time-modulation will be integrated by the eye over a period corresponding to the eye time response. When an observation point (eye focus area) on the PDP screen moves, the eye will follow this movement. Consequently, it will no more integrate the light from the same cell over a frame period (static integration) but it will integrate information coming from different cells located on the movement trajectory. Thus it will mix all the light pulses during this movement which leads to a faulty signal information. This effect will now be explained in more detail below.

In the field of video processing is an 8-bit representation of e.g. a luminance level very common. In this case each level will be represented by a combination of the following 8 bits:

$2^0=1$, $2^1=2$, $2^2=4$, $2^3=8$, $2^4=16$, $2^5=32$, $2^6=64$, $2^7=128$

Figure 2:
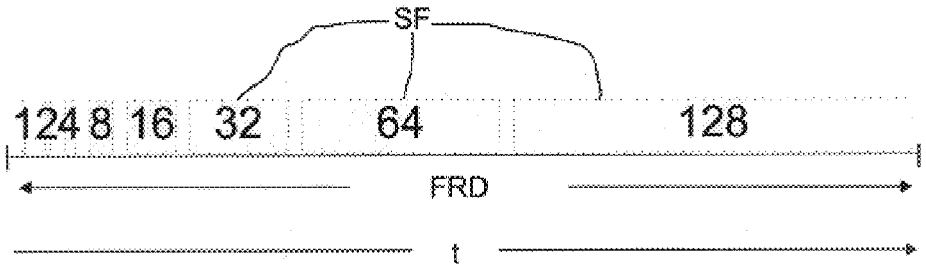
FIG. 2 shows an illustration for explaining the sub-field organization of a PDP.

To realize such a coding scheme with the PDP technology, the frame period will be divided in 8 lighting periods which are also very often referred to sub-fields, each one corresponding to one of the 8 bits. The number of light pulses for the bit $2^1=2$ is the double of that for the bit $2^0=1$, etc. . . With a combination of these 8 sub-periods, we are able to build said 256 different gray levels. Without motion, the eye of the observer will integrate over about a frame period these sub-periods and will have the impression of the right gray level. The above-mentioned sub-field organization is shown in FIG. 2.

The light emission pattern according to the sub-field organization introduces new categories of image quality degradation corresponding to disturbances of gray levels and colors. As already explained, these disturbances are defined as so-called dynamic false contour effect since the fact that it corresponds to the appearance of colored edges in the picture when an observation point on the PDP screen moves. The observer has the impression of a strong contour appearing on a homogeneous area like displayed skin. The degradation is enhanced when the image has a smooth gradation and also when the light emission period exceeds several milliseconds. So, in dark scenes the effect is not so disturbing as in scenes with average gray level (e.g. luminance values from 32 to 223).

In addition, the same problem occurs in static images when observers are shaking the heads which leads to the conclusion that such a failure depends on the human visual perception.

Figure 4:
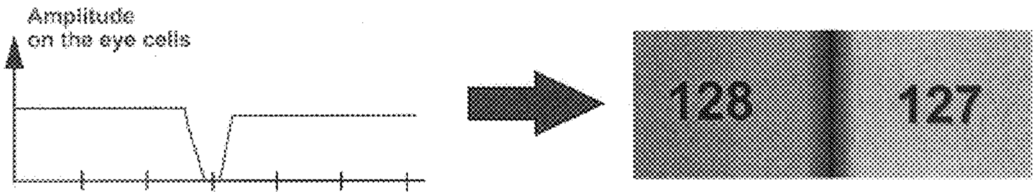
FIG. 4 illustrates the appearance of a dark edge when a display of two frames is being made in the manner shown in FIG. 3.
Figure 3:
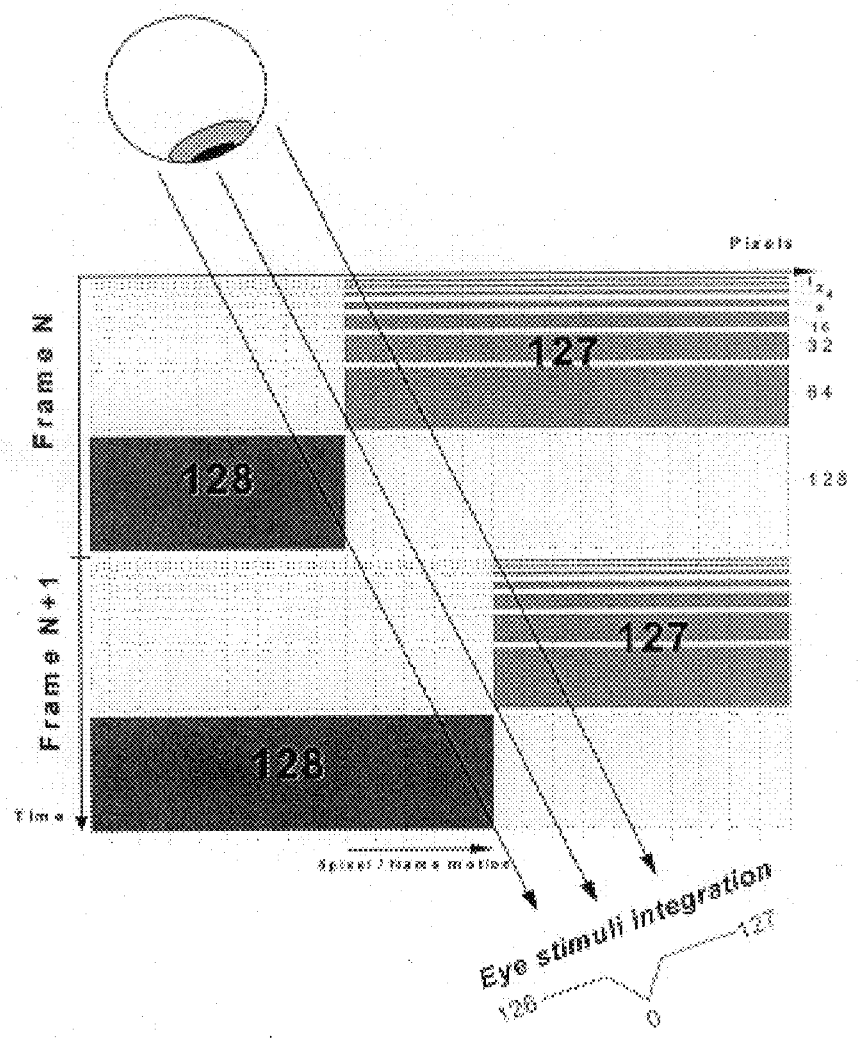
FIG. 3 shows an illustration for explaining the false contour effect.

To better understand the basic mechanism of visual perception of moving images, a simple case will be considered. Let us assume a transition between the luminance levels 128 and 127 moving at a speed of 5 pixel per video frame and the eye is following this movement. FIG. 3 shows a darker shaded area corresponding to the luminance level 128 and a lighter shaded area corresponding to the luminance area level 127. The sub-field organization, shown in FIG. 2 is used for building the luminance levels 128 and 127 as it is depicted on the right side of FIG. 3. The three parallel lines in FIG. 3 indicate the direction in which the eye is following the movement. The two outer lines show the area borders where a faulty signal will be perceived. Between them the eye will perceive a lack of luminance which leads to the appearance of a dark edge in the corresponding area which is illustrated in FIG. 4. The effect that a lack of luminance will be perceived in the shown area is due to the fact that the eye will no more integrate all lighting periods of one pixel when the point from which the eye receives light is in movement. Only part of the light pulses will probably be integrated when the point moves. Therefore, there is a lack of corresponding luminance and the dark edge will occur. On the left side of FIG. 4, there is shown a curve which illustrates the behavior of the eye cells during observing the moving picture depicted in FIG. 3. The eye cells having a good distance from the horizontal transition will integrate enough light from the corresponding pixels. Only the eye cells which are near the transition will not be able to integrate a lot of light from the same pixels.

Figure 5:
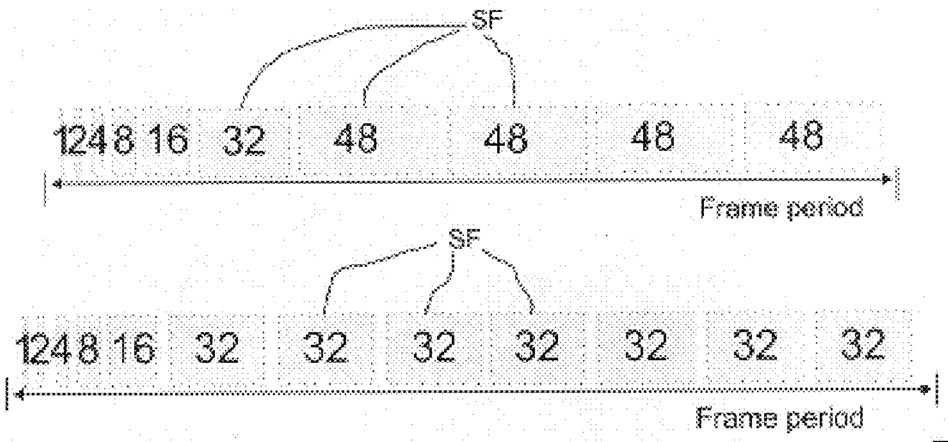
FIG. 5 shows two different sub-field organization schemes.

To improve this behavior at first, a new sub-field organization is presented which has more sub-fields and above all has more sub-fields with the same weight. This will already reduce the contouring effect and improve the situation. Furthermore, it allows for the inventive correction method which will be explained afterwards. In FIG. 5 two examples of new coding schemes are shown. The choice of the optimal one has to be made depending on the plasma technology. In the first example there are ten sub-fields used wherein there are four sub-fields having lighting periods with a relative duration of 48/256. In the second example there are twelve sub-fields and there are seven sub-fields having the relative duration of 32/256. Please note that the frame period has a relative duration of 256/256.

Figure 6:
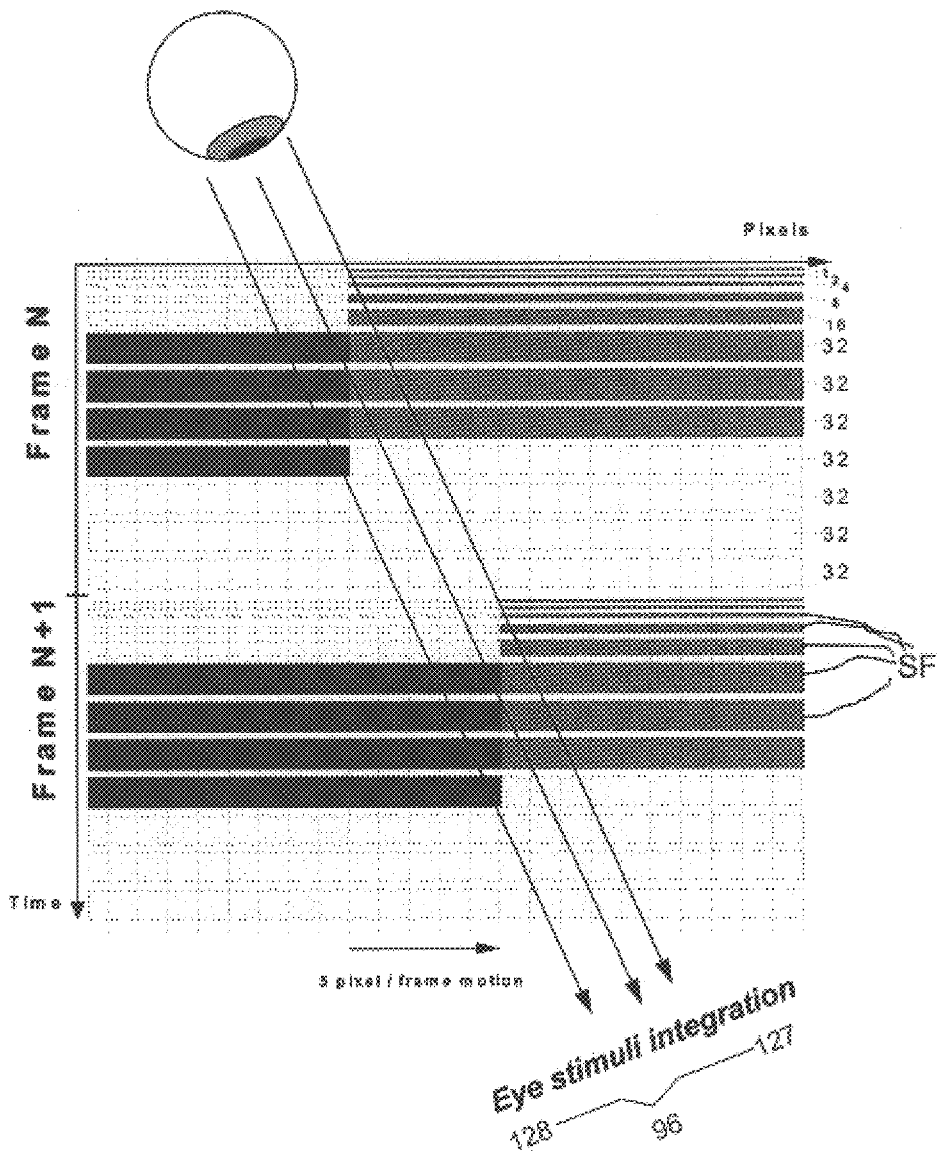
FIG. 6 shows the illustration of FIG. 3 but with sub-field organization according to FIG. 5.

In FIG. 6 the result of the new sub-field organization according to the second example of FIG. 5 is shown in case of the 128/127 horizontal transition moving at a speed of five pixels per frame. Now, the chance that the corresponding eye cells will integrate more similar amounts of lighting periods is increased. This is illustrated by the eye-stimuli integration curve at the bottom of FIG. 6 when compared to the eye-stimuli integration curve at the bottom of FIG. 3. For false contour reduction some solutions exist in which correction signals are added to the video signal in order to compensate the lack of luminance (dark edges) or the increase of luminance (luminous edges). All the solutions known reduce or increase the amplitude of the video signal in areas where false contour occurs.

The following example explains the used principle:

It is assumed that an 3×8 bit coded RGB picture is converted to 12 bit sub-field codes. This conversion is realized for example by a LUT (Look Up Table) in which the 12 bit sub-field codes are stored for the different 8 bit RGB data words. In this way the the video signal (3 times for RGB) is converted into the sub-field code of 12 bit for each color channel.

The known false contour correction methods (with equalizing pulses) correct directly the pixel values of the video signal, i.e. correction is done before the sub-field conversion.

Figure 7A:
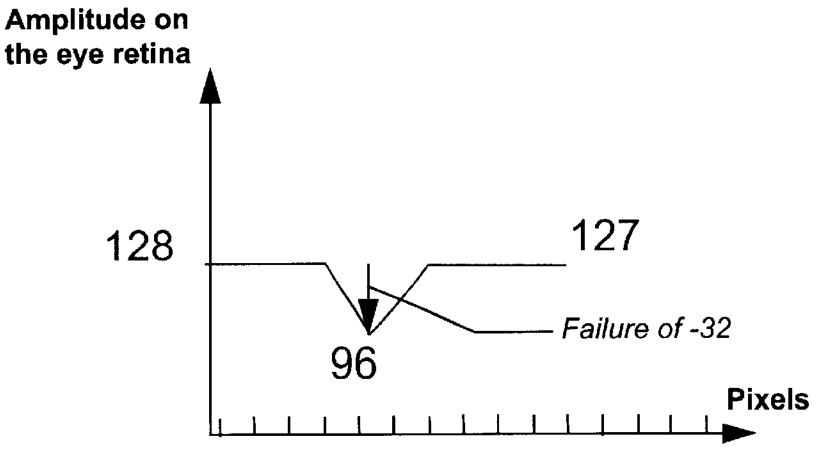
FIG. 7 shows the effect on eye retina for the amplitude based correction of the false contour effect.
Figure 7B:
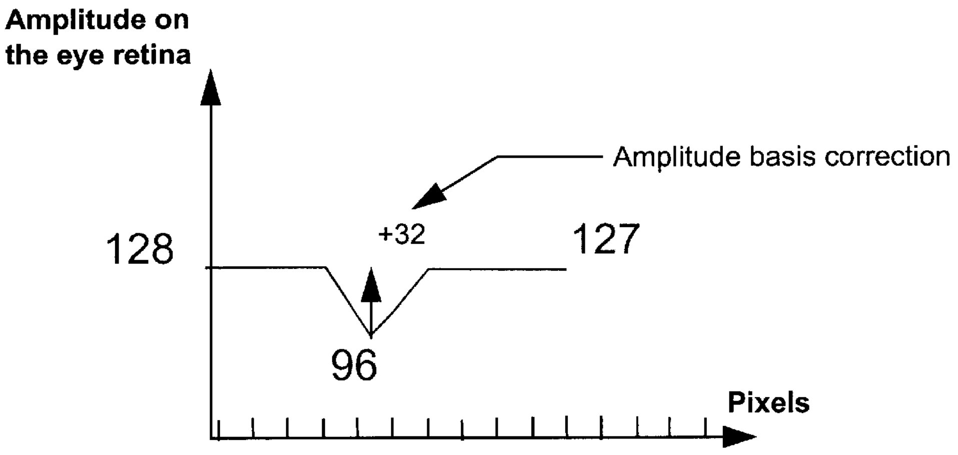

An illustration of this method is shown in FIG. 7. From FIG. 7*a*) it follows that in the middle of the transition the amplitude on the eye retina has a lack of 32 relative amplitude units. This is compensated by simply adding this value to the pixels of the transition, see FIG. 7*b*) . Since the brightness impression on the eye is given by the integration of the light amplitude over a certain time period, such a correction cannot be perfect when the eye moves.

Figure 8:
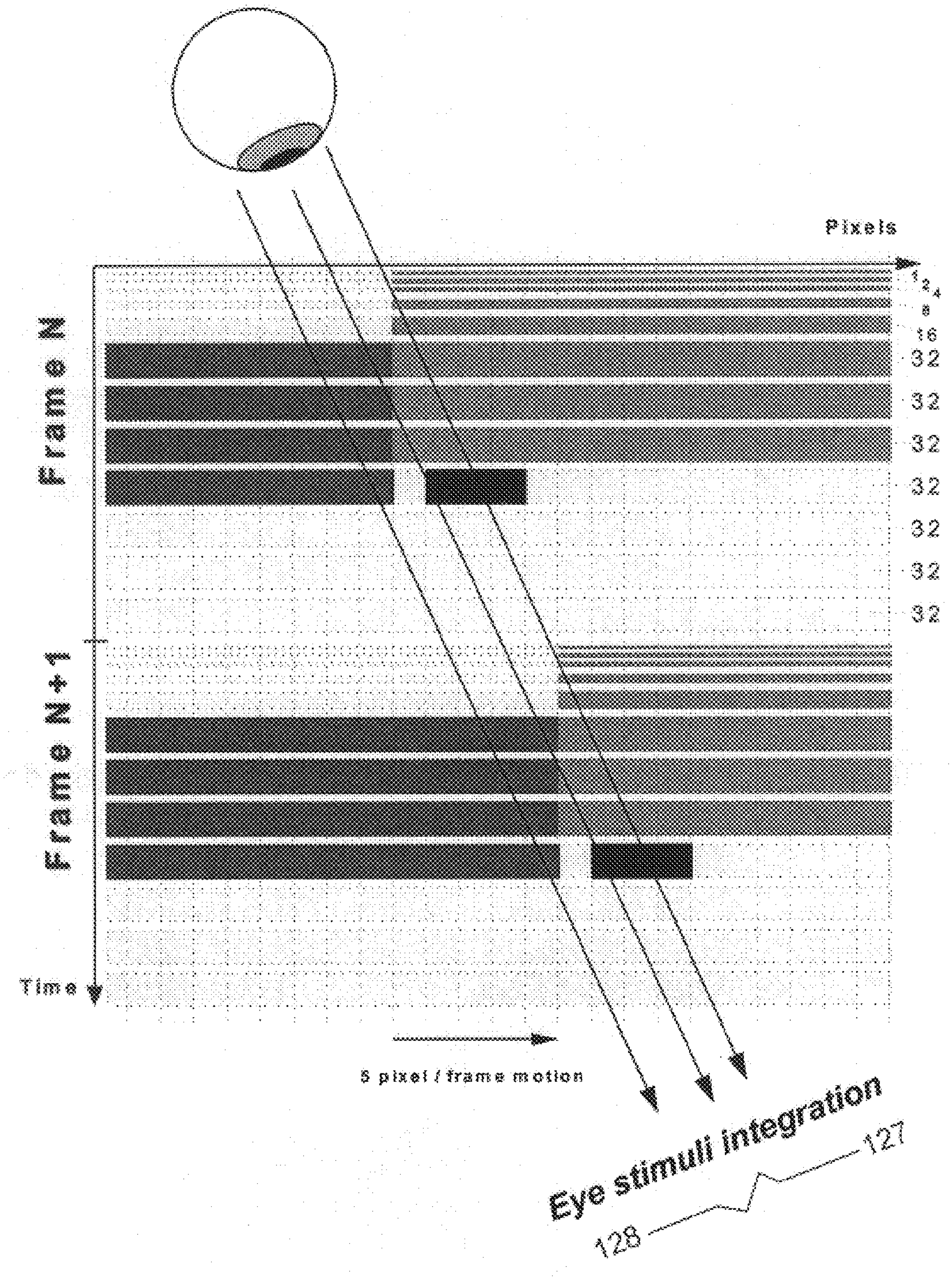
FIG. 8 shows the effect on the eye retina for the amplitude based correction illustrated with sub-field resolution.

The effect on sub-field level after generation of the sub-field code words is shown in FIG. 8. For three pixels of the transition an additional sub-field with weight 32 corresponding to the correction value +32 is activated (see the dark black bars shown in FIG. 8). Note, that only three pixels of the transition have the additional sub-field of weight 32. This is because the transition would otherwise be distorted. The eye stimuli integration curve shown at the bottom of FIG. 8 indicates that the false contour effect is reduced compared to FIG. 6 but still present.

The disadvantage of the amplitude correction can also be seen on the table below. Taking the previous example, a correction value of 32 can have an influence on different timing positions, e.g. SF9 or SF10.

The effect of the two corrections shown in the table implemented (add of the sub-field No. 9 or 10 with both a value of 32) are totally different for the eye and consequently for the impression of picture brightness but they both have the same amplitude of 159.

| Sub-Field | SF0 | SF1 | SF2 | SF3 | SF4 | SF5 | Ampl. |
|---|---|---|---|---|---|---|---|
| Corr. 1 | 1 | 2 | 4 | 8 | 16 | 32 | |
| Corr. 2 | 1 | 2 | 4 | 8 | 16 | 32 | |
| **Sub-Field** | **SF6** | **SF7** | **SF8** | **SF9** | **SF10** | **SF11** | **Ampl.** |
| Corr. 1 | 32 | 32 | 32 | 0 | 0 | 0 | 159 |
| Corr. 2 | 32 | 32 | 0 | 32 | 0 | 0 | 159 |

Figure 9:
FIG. 9 shows the video picture of FIG. 1 with a subdivision in blocks of pixels.

Already for the compensation technique used for in FIG. 8 its necessary to have knowledge about the movement in the picture and where the critical transition is located. A motion estimator is applied for providing motion vectors of blocks of pixels. At first, the original picture is segmented in blocks, each of which will have a single motion vector assigned. An example of such a decomposition is shown in FIG. 9. Other types of motion-dependent pictures segmentations could be used, since the goal is only to decompose the picture in basic elements having a well-defined motion vector. So all motion estimators can be used for the invention, which are able to subdivide a picture in blocks and to calculate for each block a corresponding motion vector. As motion estimators are well-known from, for example 100 Hz up-conversion technique and also from MPEG coding etc., they are well-known in the art and there is no need to describe them in greater detail here. As an example where a motion estimator is described which could be used in this invention, it is referred to WO-A-89/08891. Best to be used are motion estimators which give precisely the direction of the movement and the amplitude of this movement for each block. Since most of the plasma display panels are working on RGB component data, benefit could be achieved when for each RGB component a separate motion estimation is being carried out and these three components are combined so that the efficiency of the motion estimation will be improved. In another block it is evaluated whether two adjacent blocks have the same motion vector in order to find the critical pixel value transitions which could cause false contours. Additionally each block can be evaluated for critical transitions. A critical transition is found when two areas of pixels with slightly different pixel values are found. Here, most of the sub-fields of the two pixel value code words are identical except for one sub-field with greater weight and a number of sub-fields with smaller weight (see e.g. FIG. 6).

A correction performed on sub-field level according to the invention allows directly to insert or to remove subfields on the position (time position within the frame) where too much or not enough light impulses are available. This way it's possible to compensate directly the failures where they occur.

In case of a sub-field based compensation, subfields are inserted or removed depending on the transition and the speed of movement. That means that it's directly possible to insert or remove light pulses on positions (in temporal direction) where they are missing or are too much. The main difference to the amplitude based compensation is that with the amplitude based compensation technique it is not possible to determine the time where the additional light pulses are best to be inserted or removed.

Figure 10:
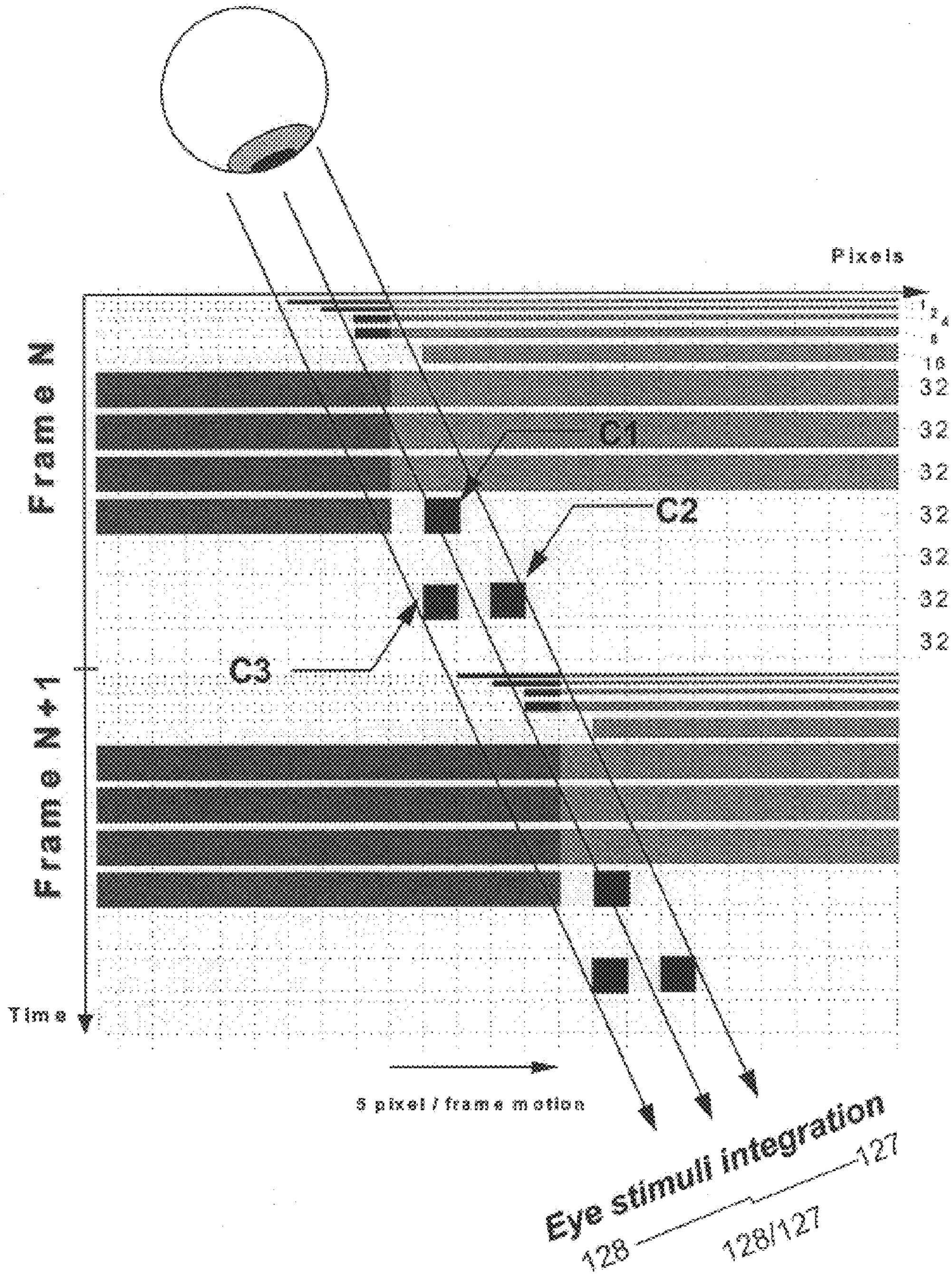
FIG. 10 shows the effect on the eye retina for the sub-field based correction method illustrated with sub-field resolution.

In FIG. 10, the subfield-based compensation technique is depicted with an example. The additional subfields are shown with small black boxes. For the first pixel having a pixel value of 127 the sub-field with weight 16 is omitted, also for compensation reason. The correction depicted in FIG. 10 is an example for a good false contour effect compensation for this transition and movement. The additional subfields are shown with small black boxes, generate light pulses exactly in the time period where they are needed. Within the area of the parallel lines shown, the eye will perceive light emission pulses of total weight ≈128 when looking along the shown direction. But it is to be noted that the integration of the eye retina is also a function of time distance between the sub-fields. So an easy way to find the best results for compensation of a given transition with a given motion vector is to make experiments.

Figure 11:
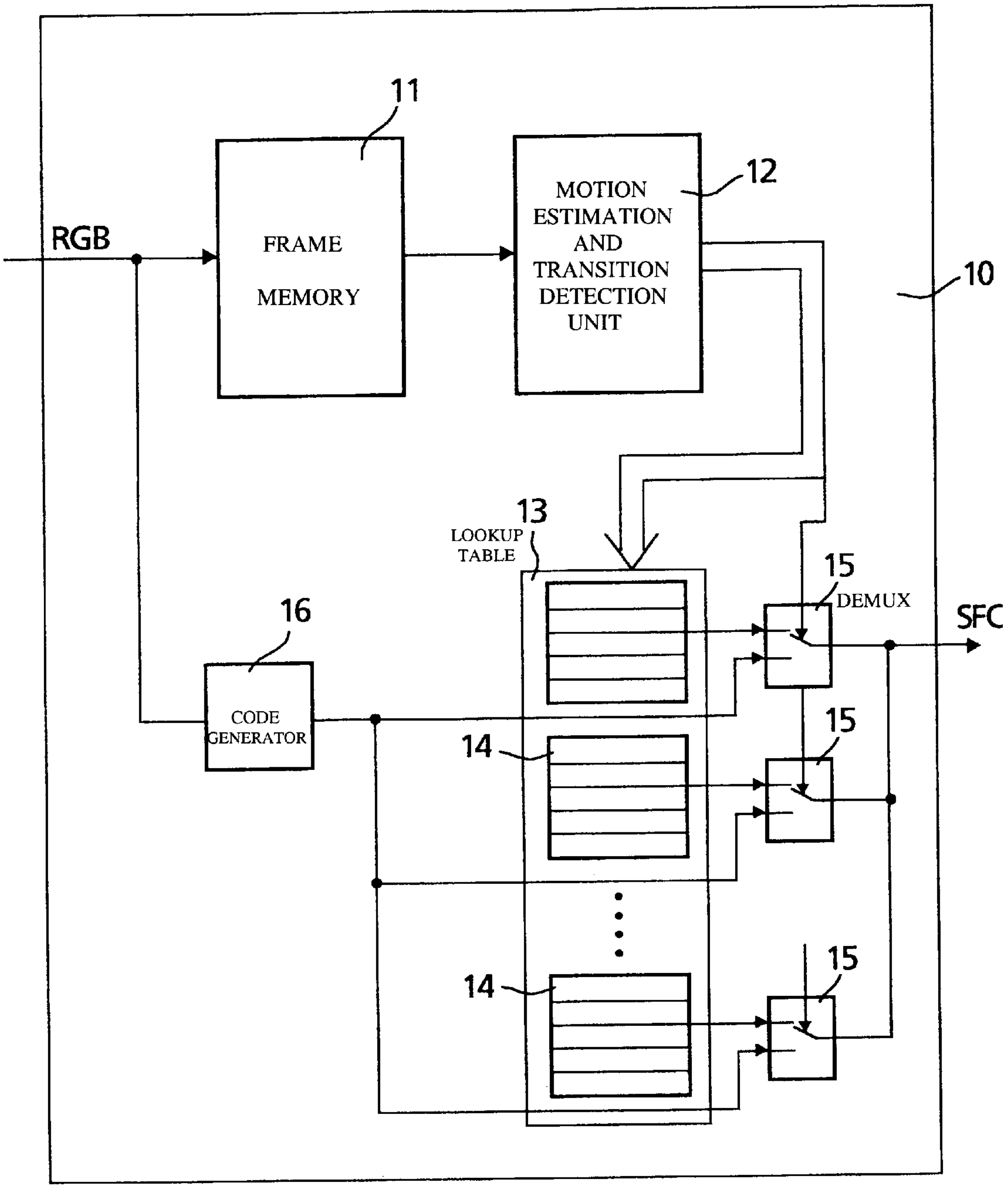
FIG. 11 shows a block diagram of the apparatus according to the invention.

The video processing block used to compensate the false contour effect is shown in FIG. 11. Reference number 10 denotes the whole block. RGB data is input to this block. After initilisation one frame N will be stored in frame memory 11 and data of frame N+1 will be delivered to a motion estimation and transition detection unit 12. Within this unit the picture is subdivided in blocks and motion vectors are calculated for the blocks. Preferably the subdivision in blocks is made so that all pixels in the blocks have identical pixel values. When the motion vectors are found, critical transitions are searched. This can be done by looking for adjacent blocks with identical motion vectors and pixel values to which sub-field codes correspond which have a difference mainly in sub-fields of greater weight, see above given explanation. Also the found transition will be classified with regard to the pixel value differences of the transition.

The information regarding the motion vector and the transition classification is fed to look up table memory 13. In look up table memory 13 a number of look up tables 14 are stored. The information regarding motion vector and transition classification serves as an address for the right table. From the information found during transition detection a control signal is generated-which controls which entry in the selected look up table is to be output. For the pixels of the transition which are to be corrected new sub-field codes are stored in the look up table and these codes are read out under control of this signal. Another control signal is generated for the control of a demultiplexer 15 at the output of the look up table. This signal is used to switch between the output of the look up table 14 and the output of sub-field code generation unit 16 in which the RGB pixel values of a frame are converted to sub-field codes. Another look up table can be used for this purpose. As a result, at the output of look up table unit 13 the sub-field codes of the frame are supplied to the display unit inclusive the corrected sub-field codes for the critical moving transitions.

The invention is not restricted to the disclosed embodiments. Various modifications are possible and are considered to fall within the scope of the claims. E.g. a different sub-field organization could be used. The values in implementations covered by the patent may differ from those here shown, in particular the number and weight of the used sub-fields.

An alternative embodiment is one without motion estimator. Here, the pixel values of two succeeding frames are compared pixel by pixel and each time, a critical difference is found a corresponding corrected sub-field code is selected in a look up table. With this simple solution the correction results will be less good as in the example explained above, but for a low cost implementation the solution may be sufficient.

All kinds of displays which are controlled by using different numbers of pulses for gray-level control can be used in connection with this invention.

What is claimed is:

1. A method for processing video pictures, useful for false contour effect compensation, the video pictures comprising pixels, the method comprising steps of:

determining a digital code word for each pixel of the pictures, the digital code word determining the length of the time period during which the corresponding pixel of a display is activated, wherein to each bit of a digital code word a certain duration is assigned, defining a sub-field, the sum of the sub-fields according to a given code word determining the length of the time period during which the corresponding pixel is activated;

determining the pixels of a picture for which a correction is needed by calculating motion vectors for blocks of pixels, wherein when two adjacent blocks with pixel values having a predefined difference move with the same motion vector, at least the pixels near the transition of the blocks are selected for correction;

generating a corrected digital code word for the pixels determined for correction in the previous step;

using the corrected digital code word for the pixels determined for correction instead of the original code word for display control, wherein the step of generating a corrected digital code word is based on a step of distributing corrections for the pixels determined for correction along a direction an observer follows the movement of the transition by inserting a sub-field activation entry where less luminance is observed and omitting a sub-field activation entry where too much luminance is observed according to the rule that along the various parallel observation trajectories for the moving transition the integration of activated sub-field weights remains stable.

2. The method according to claim 1, wherein the frame period has a relative duration of 256 time units and is sub-divided into 12 sub-fields, with 7 of said 12 sub-fields have a duration of 32 time units, wherein each of the remaining 5 sub-fields respectively has a different duration.

3. An apparatus for processing video pictures, useful for false contour effect compensation, the video pictures comprising pixels, the apparatus comprising:

a coding unit responsive to the pixels of the video pictures for generating a digital code word for each pixel, the digital code word determining the length of the time period during which the corresponding pixel of a display is activated, wherein to each bit of a digital code word a certain duration is assigned, defining a sub-field, the sum of the sub-fields according to a given code word determining the length of the time period during which the corresponding pixel is activated;

a motion estimator for calculating motion vectors for blocks of pixels of a video frame, the apparatus further comprising a number of look up tables for different motion vectors and different pixel value transitions, wherein the lookup tables contain for at least the pixels of the respective transition, corrected digital code words generated based on distributing the corrections for the pixels determined for correction along a direction an observer follows the movement of the transition wherein a sub-field activation entry is inserted where less luminance is observed and a sub-field activation entry is omitted where too much luminance is observed according to the rule that along the parallel observation trajectories for the moving transition the integration of activated sub-field weights remains stable.

4. An apparatus according to claim 3, further comprising a matrix display.

5. An apparatus according to claim 4, wherein the matrix display comprises a plasma display.

6. An apparatus according to claim 4, wherein the matrix display comprises a DMD display.

* * * * *